US006246948B1

(12) United States Patent
Thakker

(10) Patent No.: US 6,246,948 B1
(45) Date of Patent: Jun. 12, 2001

(54) WIRELESS INTELLIGENT VEHICLE SPEED CONTROL OR MONITORING SYSTEM AND METHOD

(75) Inventor: Kaushal Thakker, Irving, TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/209,921

(22) Filed: Dec. 10, 1998

(51) Int. Cl.[7] ............................... G06F 7/00; G06F 17/00

(52) U.S. Cl. ............................ 701/93; 701/110; 701/200; 701/70; 180/170; 180/171; 123/351

(58) Field of Search ............................... 701/93, 110, 70, 701/200; 180/170, 171; 123/351

(56) References Cited

U.S. PATENT DOCUMENTS

| | | | |
|---|---|---|---|
| 5,673,305 | 9/1997 | Ross ....................................... | 379/58 |
| 5,749,063 | 5/1998 | Sakonjyu ............................... | 701/93 |
| 6,016,458 * | 1/2000 | Robinson et al. ..................... | 701/93 |

* cited by examiner

*Primary Examiner*—William A. Cuchlinski, Jr.
*Assistant Examiner*—Olga Hernandez
(74) *Attorney, Agent, or Firm*—Arthur I. Navarro

(57) ABSTRACT

A system (12) and method for automatically monitoring and/or controlling the actual speed of a vehicle (10) relative to the legal speed limit of the geographic area the vehicle is located in. A wireless transmission (32) containing location or legal speed limit information is received from a transmission source (24). If location information is obtained, database (40) is queried to obtain legal speed limit information for the physical location of the vehicle. The legal speed limit is stored into a memory space (36). Alternatively, the legal speed limit is used to control the actual speed of the vehicle. In a monitor mode, the system (12) compares the actual speed of the vehicle to the legal speed limit with a processor (37), and the relative information may be communicated to the driver. In an offset mode, the system (12) controls the actual speed of the vehicle to an offset amount relative to the legal speed limit, where the offset amount is set by the driver of the vehicle. The transmission source (24) may be a GPS-compatible satellite network (30) or a transmitter (28) on a traffic sign (26).

11 Claims, 3 Drawing Sheets

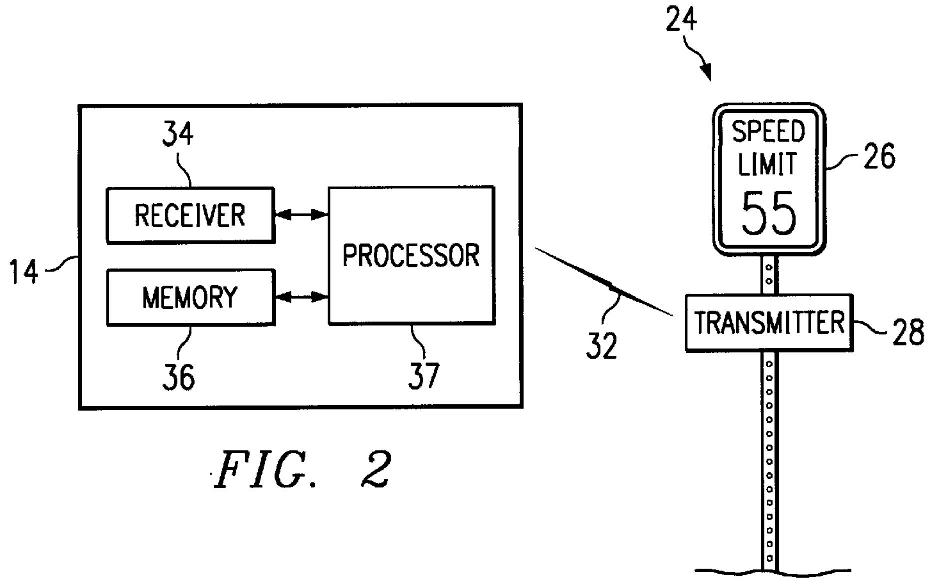
*FIG. 2*
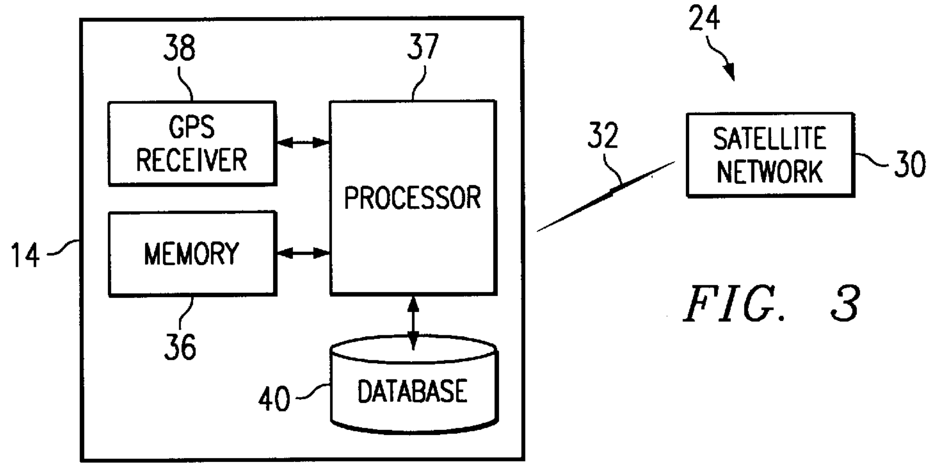
*FIG. 3*
*FIG. 4*
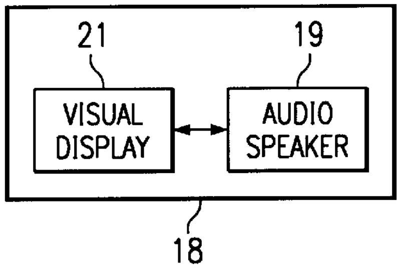
*FIG. 6*
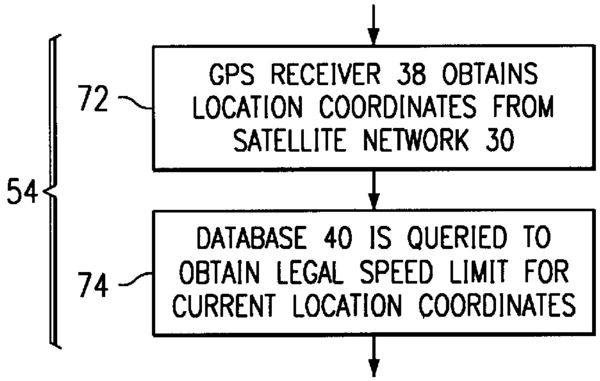

WIRELESS INTELLIGENT VEHICLE SPEED CONTROL OR MONITORING SYSTEM AND METHOD

TECHNICAL FIELD

This invention relates generally to automatic speed controls for a vehicle, and more particularly to a system and method for receiving wireless signals, storing a legal speed limit at a geographic location, and controlling or monitoring the actual speed of a vehicle in relation to the legal speed limit.

BACKGROUND OF THE INVENTION

Automatic cruise control devices have been available for cars and other vehicles for years. Now, many cars may be equipped with a cruise control system direct from the factory. For example, U.S. Pat. No. 5,749,063 issued on May 5, 1998 to Sakonjyu et al. describes an improved automatic speed controlling apparatus for a vehicle designed to ensure a smooth driving feeling. Automatic cruise control devices are particularly advantageous on freeway driving or long road trips by automatically maintaining the speed of the vehicle to the cruising speed set by the driver.

Automatic speed controls of the past rely on the driver's judgement to set, monitor and control the speed of the vehicle. Also, the driver has the responsibility to ensure that the cruising speed of the vehicle is set to or below the legal speed limit. Occasionally, a driver may set the cruise control device to a higher speed on a highway and then drive through a small town having a lower legal speed limit without noticing the legal speed limit has changed. This results in traffic tickets and dangerous driving conditions for the driver, passengers, other drivers, and pedestrians. To avoid this situation, the driver must remain alert and notice when the legal speed limits change along the route to his destination. A method and system for controlling and monitoring the speed of a vehicle in relation to the legal speed limit at the geographic location of the vehicle would be useful, so the driver no longer has the burden of setting a safe cruising speed or keeping up with changing speed limits in different locations.

SUMMARY OF THE INVENTION

The present invention solves the problems of prior art automatic cruise control devices by providing feedback to the driver of his current speed with respect to the legal speed limit at the driving area. The actual speed of the vehicle can be set to the present legal speed limit or to a speed in relation to the present legal speed limit, or monitored to notify the driver if he exceeds the legal speed limit, with the intelligent automatic vehicle speed control and monitoring system and method described herein.

In one embodiment, disclosed is an automatic vehicle speed control system in a vehicle having a speed sensor and a cruise control device with a speed controller. The control system includes a receiver adapted to receive wireless signals from a transmission source, memory space coupled to the receiver, and a processor coupled to the receiver and the memory space. The control system is adapted to control the actual speed of the vehicle in relation to the stored legal speed limit at the current geographic location of the vehicle.

In another embodiment, disclosed is an automatic vehicle speed monitoring system including a receiver adapted to receive wireless signals from a transmission source, memory space coupled to the receiver for storing a legal speed limit of a current geographic location of the vehicle, and a processor coupled to the receiver. The processor is adapted to compare the actual speed of the vehicle with the stored legal speed limit at the current geographic location of the vehicle.

In another embodiment, disclosed is a method for automatically controlling the speed of a vehicle, where the method includes the steps of receiving a wireless signal, storing a legal speed limit of a current geographic location of the vehicle, and controlling the actual speed of the vehicle with the stored legal speed limit of the current geographic location of the vehicle.

Also disclosed is a public utility device for transmitting wireless legal speed limit information for a geographic region, where the device includes a power source, a wireless transmitter powered by the power source for transmitting the legal speed limit, and a memory coupled to the transmitter and the power source, where the memory contains the legal speed limit for the geographic region.

BRIEF DESCRIPTION OF THE DRAWINGS

The above features of the present invention will be more clearly understood from consideration of the following detailed description in connection with the accompanying drawings in which:

FIG. 2 illustrates an embodiment of the present invention where the transmission source 24 includes a transmitter 28 mounted on a speed limit sign 26;

FIG. 3 illustrates an embodiment of the present invention where the transmission device 24 comprises a satellite network 30;

FIG. 4 illustrates components of the communicator 18 of the present invention;

FIG. 6 shows a more detailed description of step 54 of flow chart 50.

Corresponding numerals and symbols in the different figures refer to corresponding parts unless otherwise indicated.

DETAILED DESCRIPTION OF PREFERRED EMBODIMENTS

The following is a description of the system and method of the present invention. Several embodiments will be described, followed by a discussion of the advantages.

Figure 1:
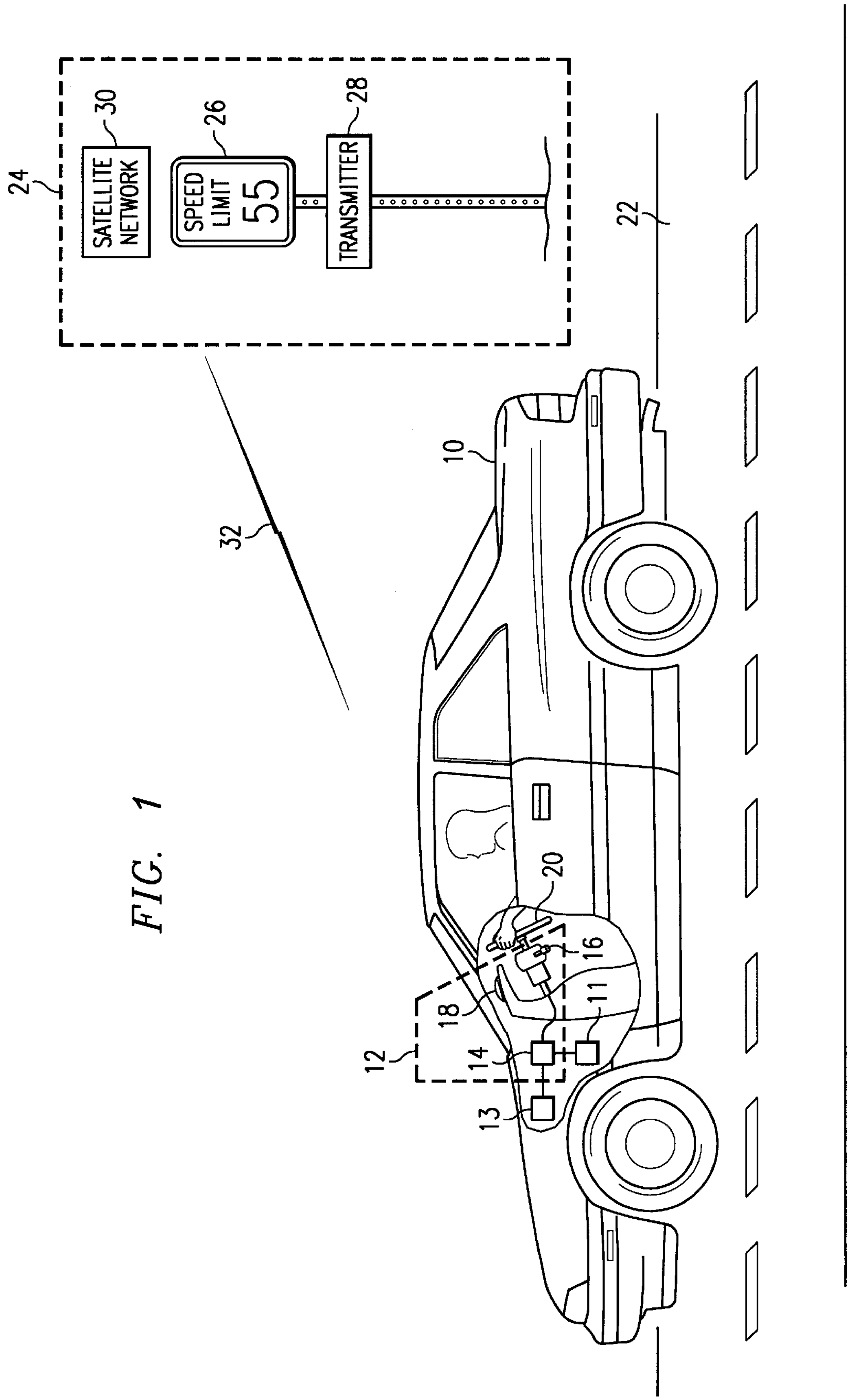
FIG. 1 illustrates a vehicle 10 having an intelligent vehicle speed control monitoring system 12 of the present invention receiving wireless signals 32 from a transmission source 24.

Referring first to FIG. 1, therein is illustrated a vehicle 10 traveling along a road 22 having a legal speed limit. The vehicle 10 includes a speed sensor 11 and a cruise control device 13 coupled to the wireless intelligent vehicle speed control and monitoring system 12 of the present invention. The cruise control device 13 includes a speed controller. The speed sensor 11 is capable of sensing the actual speed of the vehicle 10.

The wireless Intelligent Vehicle Speed Control (IVSC) system 12 preferably comprises a speed controller and monitor 14 and an activator 16, and may comprise an optional communicator 18. The wireless IVSC system 12 is shown in FIG. 1 located under the hood, but may be located elsewhere on the vehicle, such as behind the dash, under the seat, or other convenient locations as are known by those skilled in the art. A consideration for placement is the receiving capability of the receiver 34 or 38 (FIGS. 2 and 3) of the speed controller and monitor 14, to be described later.

Preferably the activator 16 is mounted inside the vehicle 10 within reach of the driver, such as on the turn indicator lever mounted to the steering wheel 20. However, the activator 16 may be located elsewhere on the vehicle 10 or may comprise a voice activation mechanism. The wireless IVSC system 12 may include a communicator 18, which may comprise a visual display 19 and/or an audio speaker 21 (FIG. 4), for example, mounted on the dash or in another area visible or audible to the driver. The optional communicator 18 communicates actual vehicle speed information obtained and being fed to the vehicle's cruise control device 13.

The speed controller and monitor 14 of wireless IVSC system 12 preferably comprises a receiver 34 or 38 (FIGS. 2 and 3) capable of receiving wireless transmissions 32 from a transmission source 24. The speed controller and monitor 14 also comprises a processor 37 coupled to the receiver 34, and memory space 36 coupled to the processor 37. The receiver 34 or 38 receives wireless transmissions 32 from the transmission source 24 which are processed by the processor 37 and stored in memory space 36. When the speed controller and monitor 14 is activated, the processor 37 uses the legal speed limit information obtained to control or monitor the speed of the vehicle in relation to the legal speed limit, to be described further.

FIG. 2 illustrates an embodiment of the present invention where the transmission source 24 comprises a transmitter 28 mounted on a traffic sign 26. The transmitter 28 may be alternatively located at other locations external to the vehicle 10, such as on traffic signals, traffic switching terminals, along a curb of the street, or located in other public utility or traffic system devices. The transmitter 28 on traffic sign 26 or other public utility device includes a wireless transmitter that transmits the legal speed limit for a particular geographical location or speed zone to passing vehicles such as vehicle 10. The transmitter 28 further comprises a power source which may be a battery, wired AC or DC power, or a solar powered battery, for example. The transmitter 28 preferably has the capability of having the legal speed limit changed by an external source, in case the legal speed limit of the geographic area is later changed. In the present embodiment, transmitters 28 may be located at traffic or public utility devices throughout a geographic region, sending legal speed limit information for particular speed zones. The legal speed limit information is receivable by vehicles equipped with wireless IVSC systems 12 of the present invention.

The legal speed limit information is preferably transmitted at a reserved radio frequency to prevent interference. For example, the Federal Communications Commission (FCC) may set aside reserved frequency spectrum of a band of frequencies to be used for the purposes of the present invention. Also, the transmitted wireless signal 32 is preferably encrypted in order to make it secure from tampering.

In the embodiment shown in FIG. 2, the vehicle 10 is equipped with a receiver 34 capable of reading the legal speed limit transmitted from transmission source 24 at a particular geographic location. The processor 37 of speed controller and monitor 14 stores the legal speed limit received by the receiver 34 in memory 36 and uses the legal speed limit information to control or monitor the speed of the vehicle 10, to be explained further herein.

FIG. 3 shows another embodiment of the present invention where the transmission source 24 comprises a satellite network 30 such as a Global Positioning System (GPS) network. The wireless IVSC system 12 of vehicle 10 includes a speed controller and monitor 14 comprising a processor 37 coupled to a GPS receiver 38, a database 40, and memory 36. In this embodiment, wireless transmissions 32 are sent from satellite network 30 and received by the GPS receiver 38 of the speed controller and monitor 14. The GPS receiver 38 is preferably placed at a location in the vehicle 10 to optimally receive information from the satellite network 30, and may be separate from the speed controller and monitor 14 (not shown).

In this embodiment, the wireless transmissions 32 contain physical location information of the vehicle 10. Database 40 of speed controller and monitor 14 contains legal speed limit information for various geographic physical locations. The data may be stored in a table format, for example, with two fields: location and legal speed limit, where the location information is used to read the speed limit from the table. When the wireless IVSC system 12 is activated, the GPS receiver 38 continuously receives the physical location coordinates of the vehicle 10 based on transmissions 32 received from the satellite network 30 which are sent to the processor 37. The processor 37 then queries the internal database 40 to obtain the legal speed limit at the current physical location of the vehicle 10 and stores the current legal speed limit into memory 36. The processor 37 uses the current legal speed limit to monitor the speed of the vehicle 10, or control the speed of the vehicle 10 to the legal speed limit or to a fixed speed in relation to the legal speed limit. The database 40 may contain city-wide or state-wide location versus legal speed limit data. However, depending on the size of the database 40, location versus legal speed limit data for a larger geographic area may be stored, for example, information for a region of a country, an entire country or several countries.

The present invention may be used as either speed controlling or speed monitoring system, or both. It is contemplated that the wireless IVSC system 12 may be configured to operate in one or a combination of three modes: first, a control mode where the vehicle's cruising speed is set to the legal speed limit; second, a monitor mode, where an audio or visual signal indicates to the driver if the legal speed limit is exceeded; and third, a fixed offset mode where the vehicle's cruising speed is set to the current legal speed limit adjusted by an offset amount determined by the driver.

In the control mode, the processor 37 of speed controller and monitor 14 sends a control message to the cruise control device 13 of the vehicle 10, indicating the desired speed of the vehicle, which is equal to the legal speed limit currently stored in the memory 36. Thus, the actual speed of the vehicle is controlled by the wireless IVSC system 12 in accordance with the legal speed limit at the geographic location the vehicle 10 is being operated in. With the wireless IVSC system 12 set in this mode, the driver of the vehicle does not have to keep track of the legal speed limit as he/she drives into different speed zones along the road, because the novel wireless IVSC system 12 automatically keeps the vehicle 10 moving at a speed less than or equal to the current legal speed limit.

In the monitor mode, the driver of the vehicle 10 retains the ability to control the speed with the accelerator pedal of the vehicle, and the wireless IVSC system 12 alerts him when the legal speed limit is exceeded with an audio or visual signal from communicator 18. FIG. 4 shows the communicator 18 comprising either an audio speaker 19 or a visual display 21 which may comprise a Liquid Crystal Display (LCD), or both. For example, if the driver operates the vehicle at speeds higher than the legal speed limit, the audio speaker 19 of communicator 18 may play a recorded announcement to make the driver aware of the violation of the legal speed limit. The processor 37 may comprise an optional feature of determining the amount or extent of the violation which can be communicated to the driver. In the monitor mode, the driver of the vehicle does not have to closely keep track of changing legal speed limits as he drives into different speed zones along the road, because the novel wireless IVSC system 12 automatically notifies if the driver if he/she exceeds the legal speed limit.

In the fixed offset mode, the driver indicates the amount of speed relative to the legal speed limit he/she wishes to go. For example, in inclement weather such as a thunderstorm, a driver may wish to drive at 5 miles per hour less than the posted legal speed limit. In a wireless IVSC system 12 configured to have this mode available, the activator 16 is preferably equipped with a mechanism allowing the driver to set a legal speed limit offset, in this case, 5 mph less than the current legal speed limit. The processor 37 obtains the legal speed limit from memory 36, adjusts the legal speed limit by the offset, and sends a control signal to the cruise control device 13 to maintain the speed of the vehicle 10 at the calculated speed.

The activating and deactivating mechanisms of the present invention are preferably similar to that of current cruise control devices. For example, when a driver of vehicle 10 wishes to activate the wireless IVSC system 12 of the present invention, he presses an activator 16 which may be a button on a turn signal lever. Additional control features are necessary to operate the wireless IVSC system 12 in the various modes described above. Deactivating the wireless IVSC system 12 is similar to that of cruise control systems: the wireless IVSC system 12 is deactivated when the brake pedal is pressed. To deploy the wireless IVSC system 12 once again, the driver must press the activator 16 to reactivate the wireless IVSC system 12.

Figure 5:
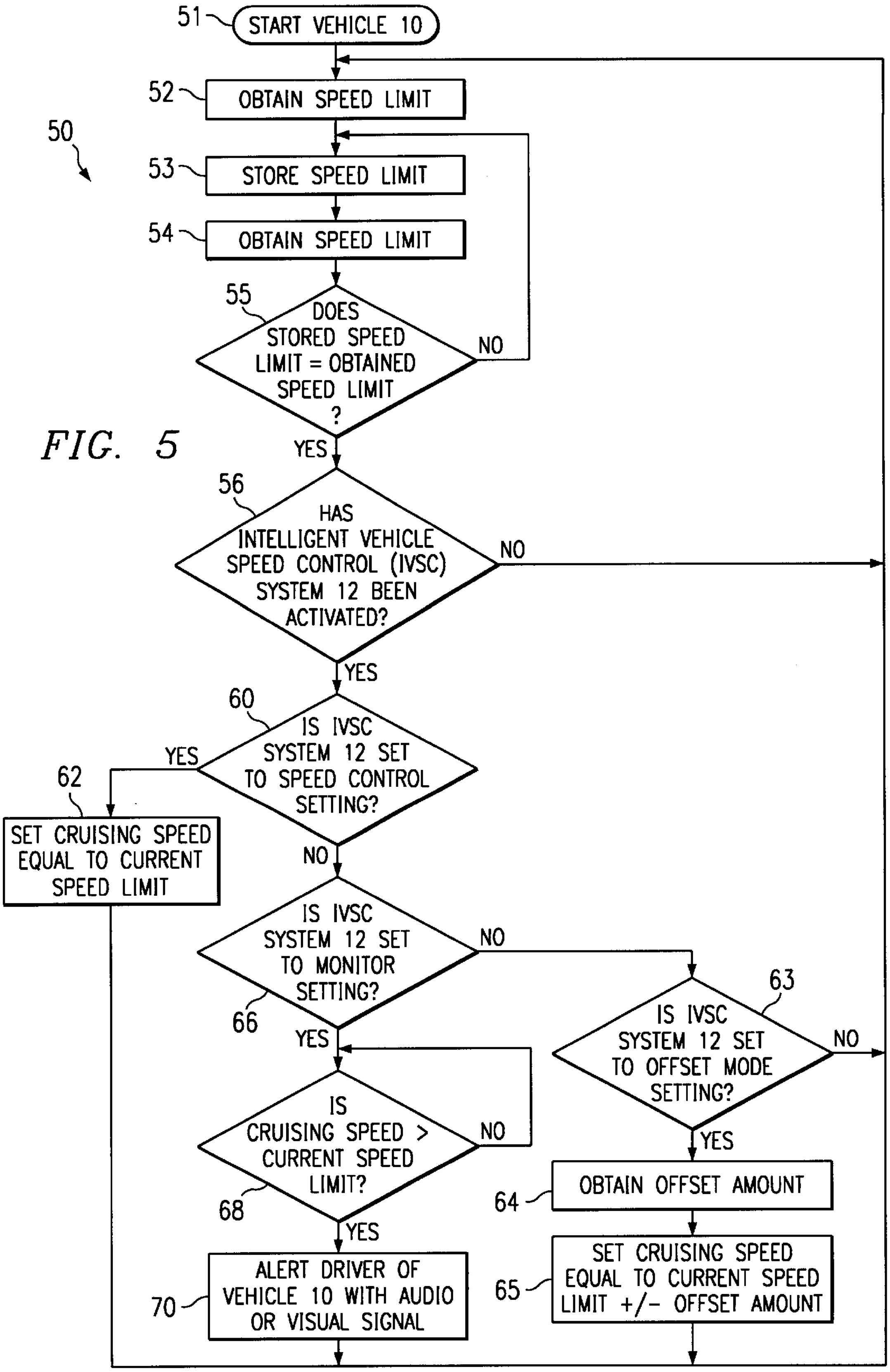
FIG. 5 shows a flow chart 50 illustrating the logical steps of the present invention.

FIG. 5 shows a flow chart 50 of a preferred method of using the present invention having a control mode, a monitoring mode and an offset mode. First, the driver starts the vehicle 10 (step 51) and the legal speed limit is obtained (step 52) either from transmitter 28 or database 40 using location information obtained from the satellite network 30 as described above. The legal speed limit is stored into memory 36 (step 53) and the legal speed limit is again obtained (step 54). Processor 37 of wireless IVSC system 12 queries whether the legal speed limit last obtained is equal to the speed limit stored into memory (step 55). If it is not equal, the legal speed limit is stored into memory 36. The IVSC system 12 continuously compares the legal speed limit to the speed limit stored into memory 36 so the current speed limit information for the geographical area is maintained and available when the system is activated.

The processor 37 of wireless IVSC system 12 queries whether the IVSC system 12 has been activated (step 56). If the wireless IVSC system 12 has not been activated, the steps of obtaining and storing the speed limit are repeated. If it has been activated, the processor 37 queries whether the wireless IVSC system 12 is set to the speed control setting (step 60). If it is, the cruising speed of the vehicle 10 is set equal to the current legal speed limit on the current location of the vehicle (step 62). If the system is not set to speed control, the system queries whether it is set to the monitor setting (step 66). If it is, the vehicle's current speed is compared to the stored legal speed limit to determine if the legal speed limit is being exceeded (step 68). If the current legal speed limit is being exceeded, the driver of the vehicle 10 is alerted with an audio or visual signal (step 70). If the system is not set to the monitor setting, the system queries whether it is set to the offset mode setting (step 63). If it is, the offset amount, set by the driver, is obtained (step 64), and the offset amount is used to set the cruising speed of the vehicle to an amount equal to the current speed limit +/− the offset amount (step 65). For this embodiment, the activator may provide a mechanism for the driver to set the offset. The amount of the offset may be displayed on communicator 18 (not shown), for example. The IVSC system 12 continuously repeats the logic of flow chart 50 when the vehicle 10 is in operation. The order of the steps in the flow chart of FIG. 5 are for illustrative purposes only; steps 60, 66 and 63 may be in any order, for example.

FIG. 6 shows a more detailed view of an embodiment of step 56 in FIG. 5 where step 56 of obtaining the current legal speed limit comprises the steps of obtaining location coordinates from the satellite network 30 (step 72) and then querying the database 40 to obtain the legal speed limit for the current location coordinates (step 74). This embodiment is used where a satellite network 30 is used to transmit geographic information and the speed control and monitor system 14 comprises a GPS receiver 38, as shown in FIG. 3.

The novel method and system of wireless intelligent vehicle speed control or monitoring provides the advantage of giving the driver of vehicle 10 the option of not having to pay close attention to legal speed limit signs. Speeding tickets and disputes with law enforcement officials over driving speeds may be reduced or virtually eliminated with the present invention. With fewer drivers speeding, roads and highways are made safer for everyone. Drivers may be more aware of their driving environment and avoid accidents easier, due to the decreased attention required to check legal speed limits.

A further advantage of the present wireless IVSC system is that the actual speed may be set to a fixed speed in relation to the current legal speed limit. This feature may be desirable in bad weather conditions or at night, or to keep pace with traffic.

Another advantage of the present invention is that it may be used in conjunction with cruise control devices currently on the market, or alternatively may be manufactured and supplied as a self-contained, separate system.

Yet another advantage is that the activating and deactivating mechanism is similar to those used in current cruise control devices, so users are already familiar with the operation. Activating the various modes of the present invention is a simple adjustment for drivers. Also, some vehicles currently equipped with GPS's may utilize their current GPS receiver in place of GPS receiver 38 for the present invention, resulting in a cost savings.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the activator 16 may be the same activator used for an existing cruise control device, adapted to activate the speed controller and monitor 14 of the present invention. Preferably, the invention is employed for use on an automobile, but may also be used on trucks, airplanes, boats and other vehicles. Alternate wireless technologies such as the Global System for Mobile communications (GSM) Short Message Service (SMS) may be used to convey location based legal speed limit information to the wireless IVSC system 12, as well. Other configurations and uses of the memory 36 are contemplated, for example, physical location information (rather than the legal speed limit) received by GPS receiver 38 may be stored in memory 36, and the database 40 may be queried periodically to obtain the legal speed limit. The visual display 21 of the communicator 18 may comprise a heads-up display (HUD), Cathode Ray Tube (CRT), or other visual means. Also, step 56 of querying whether the IVSC system 12 has been activated in the flow chart of FIG. 5 may be eliminated so the system is automatically activated when the car is started. The present invention may be manufactured with any one, combination, or all of the three modes described herein (control, monitor or offset). It is therefore intended that the appended claims encompass any such modifications or embodiments.

What is claimed is:

1. A public utility device for transmitting wireless legal speed limit information for a geographic region, said device comprising;

a power source;

a wireless transmitter powered by said power source for transmitting said legal speed limit; and a memory coupled to said transmitter and said power source, said memory containing the legal speed limit for said geographic region.

2. The device of claim 1 wherein said legal speed limit stored in said memory is changeable by an external source.

3. The device of claim 1 wherein said power source is selected from the group consisting of a battery, permanently wired AC current or DC current, and a solar power supply.

4. The device of claim 1 wherein said public utility device is selected from the group consisting of a traffic sign, a traffic signal, a traffic light switching terminal, or a street curb.

5. The device of claim 1 wherein said wireless transmitter transmits Radio Frequency (RF) signals.

6. The device of claim 5 wherein said wireless transmitter transmits encrypted signals.

7. In a vehicle having a speed sensor and a cruise control device, an automatic vehicle speed control system adapted to receive wireless signals from a transmission source comprising a satellite network, said speed sensor coupled to the vehicle for sensing the actual speed of said vehicle, said cruise control device having a speed controller, said control system comprising:

a receiver adapted to receive said wireless signals, wherein said receiver comprises a Global Positioning System (GPS) receiver adapted to receive the current location of said vehicle from said satellite network;

a memory space coupled to said receiver for storing a legal speed limit of a current geographic location of said vehicle;

a processor coupled to said receiver and said memory space, said processor adapted to control said actual speed of said vehicle in relation to said stored legal speed limit of said current geographic location of said vehicle; and a legal speed limit database coupled to said processor, wherein said legal speed limit of said current geographic location of said vehicle is obtainable from said legal speed limit database.

8. In a vehicle having a speed sensor and a cruise control device, an automatic vehicle speed monitoring system adapted to receive wireless signals from a transmission source comprising a satellite network, said cruise control device having a speed controller, said speed sensor sensing the actual speed of said vehicle, said monitoring system comprising:

a receiver adapted to receive said wireless signals, wherein said receiver comprises a Global Positioning System (GPS) receiver adapted to receive the current physical location of said vehicle from said satellite network;

a memory space coupled to said receiver for storing a legal speed limit of a current geographic location of said vehicle;

a processor coupled to said receiver and said memory space, said processor adapted to compare said actual speed of said vehicle with said stored legal speed limit of said current geographic location of said vehicle; and a legal speed limit database coupled to said processor, wherein said legal speed limit of said current geographic location of said vehicle is obtainable from said legal speed limit database.

9. A method for automatically controlling the speed of a vehicle, said vehicle having a cruise control device and a speed sensor for sensing the actual speed of said vehicle, said cruise control device having a speed controller, said method comprising the steps of:

receiving a wireless signal;

storing a legal speed limit of said current geographic location of said vehicle;

controlling said actual speed of said vehicle with said stored legal speed limit of said current geographic location of said vehicle; and limiting the actual speed of said vehicle relative to the legal speed limit of said current geographic location.

10. The method of claim 9 wherein said step of receiving a wireless signal is followed by the step of retrieving a legal speed limit of said current geographic location from a legal speed limit database.

11. The method of claim 9 wherein said step of receiving a wireless signal further comprises the step of receiving a transmission from a public utility device, said public utility device comprising a traffic sign.

* * * * *